US012771225B2

(12) United States Patent
(10) Patent No.: US 12,771,225 B2
(45) Date of Patent: Oct. 20, 2026

Ledfelt et al.

(54) METHOD, CONTROLLER AND CIRCUIT FOR OPERATING A CONVERTER WITHIN AN OPERATING RANGE

(71) Applicant: Traton AB, Södertälje (SE)

(72) Inventors: Gunnar Ledfelt, Nykvarn (SE); Lukas Rydén, Solna (SE); Viktor Nyman, Hägersten (SE)

(73) Assignee: Traton AB, Södertälje (SE)

( * ) Notice: Subject to any disclaimer, the term of this patent is extended or adjusted under 35 U.S.C. 154(b) by 0 days.

(21) Appl. No.: 18/873,788

(22) PCT Filed: Jun. 21, 2023

(86) PCT No.: PCT/SE2023/050636
§ 371 (c)(1),
(2) Date: Dec. 11, 2024

(87) PCT Pub. No.: WO2024/005691
PCT Pub. Date: Jan. 4, 2024

(65) Prior Publication Data

US 2025/0364884 A1 Nov. 27, 2025

(30) Foreign Application Priority Data

Jun. 30, 2022 (SE) .................................... 2250818-8

(51) Int. Cl.
*B60L 1/00* (2006.01)
*B60L 50/60* (2019.01)
(Continued)

(52) U.S. Cl.
CPC ........... *H02M 1/0009* (2021.05); *B60L 50/60* (2019.02); *H02J 1/082* (2020.01); *H02M 1/0083* (2021.05);
(Continued)

(58) Field of Classification Search
CPC .. B60L 2210/14; B60L 2210/12; B60L 50/60; H02J 1/082; H02J 2310/48; H02J 2310/50; H02J 2310/52; H02M 1/0009
See application file for complete search history.

(56) References Cited

U.S. PATENT DOCUMENTS

2002/0043966 A1 4/2002 Matsuda
2009/0134841 A1 * 5/2009 Gilmore .............. H01M 10/482 320/136
(Continued)

FOREIGN PATENT DOCUMENTS

DE 102013225097 A1 6/2015
DE 112015002971 T5 3/2017
(Continued)

OTHER PUBLICATIONS

Scania CV AB, International Patent Application No. PCT/SE2023/050636, International Search Report, Jun. 29, 2023.
(Continued)

*Primary Examiner* — Ryan Johnson
*Assistant Examiner* — Esayas G Yeshaw
(74) *Attorney, Agent, or Firm* — Moore & Van Allen PLLC; W. Kevin Ransom

(57) ABSTRACT

The present application relates to a method of operating a converter within an operating range, the converter being comprised in an electrical circuit for a vehicle, which electrical circuit comprises at least one load and at least one battery pack, comprising the steps of determining the operating range by determining the relation between output current from the converter with rapid current drop in the electrical circuit, which rapid current drop is based on parameters from the at least one load and the at least one
(Continued)

battery pack, and regulating the voltage from the converter for controlling the output current within the determined operating range.

20 Claims, 4 Drawing Sheets

(51) Int. Cl.
*H02J 1/082* (2026.01)
*H02M 1/00* (2006.01)
*H02J 105/37* (2026.01)

(52) U.S. Cl.
CPC ....... *B60L 2210/12* (2013.01); *H02J 2105/37* (2026.01)

(56) References Cited

U.S. PATENT DOCUMENTS

2013/0127247 A1 5/2013 Oh et al.
2017/0144556 A1* 5/2017 Kim ........................ B60L 58/20
2020/0023746 A1* 1/2020 Kim .................... H02M 1/4216
2020/0377073 A1 12/2020 Oiwa
2021/0086660 A1* 3/2021 Verdier ................... B60L 58/12
2021/0184577 A1* 6/2021 Yang ................... H02M 1/0003

FOREIGN PATENT DOCUMENTS

DE 102016212111 A1 6/2017
EP 2465734 A1 6/2012
KR 1020140068556 A 6/2014

OTHER PUBLICATIONS

Scania CV AB, International Patent Application No. PCT/SE2023/050636, Written Opinion, Jun. 29, 2023.
Scania CV AB, Swedish Patent Application No. 2250818-8, Office Action, Jan. 27, 2023.
Traton AB, European Patent Application No. 23832006.3, Extended European Search Report, Jun. 10, 2026.

* cited by examiner

METHOD, CONTROLLER AND CIRCUIT FOR OPERATING A CONVERTER WITHIN AN OPERATING RANGE

CROSS-REFERENCE TO RELATED APPLICATION(S)

This application is a national stage application (filed under 35 § U.S.C. 371) of PCT/SE2023/050636, filed Jun. 21, 2023 of the same title, which, in turn claims priority to Swedish Application No. 2250818-8, filed on Jun. 30, 2022; the contents of each of which are hereby incorporated by reference.

TECHNICAL AREA

The present application relates to electrically powered and hybrid powered vehicles provided with maintenance batteries and loads energized by a converter.

BACKGROUND OF INVENTION

Conventionally electrically propelled vehicles are provided with an electric power system comprising at least one converter, several loads and at least one maintenance battery. The electrical power system may be provided with electrical energy from a propulsion battery system of the vehicle. The converter is arranged to convert the high voltages from the propulsion battery system to lower voltages for e.g. energizing the loads and for charging the maintenance batteries.

The converter is provided with an overvoltage protection circuit for preventing the converter to output high voltages if internal catastrophic failures occur. Since the converter input energy is supplied by the propulsion battery system, the overvoltage protection circuit is a precaution. However, the overvoltage circuit cannot distinguish between high voltages caused by internal failures or high voltages as a result of fast changes of currents in the low voltage electric power system.

The latter situation may occur if loads or maintenance batteries in the electric power system are suddenly disconnected, often named load dump, causing high voltage transients. If the maintenance batteries are still connected during a load dump, they will usually provide a voltage stabilizing effect, thus lowering the voltage transients. However, if the maintenance batteries are suddenly disconnected, due for instance to failure of the battery cable terminals or corrosion related interruptions, there is no stabilizing effect on the voltage transients. If a loss of batteries occurs at high battery charging currents, the voltage transients may trip the overvoltage protection circuit of the converter.

On the other hand, if the maintenance batteries are disconnected without causing very high voltage transients, then a large reduction in load current may also cause a high voltage transient that may trigger the overvoltage protection circuit. Also, large kick back currents from loads may trigger the overvoltage protection circuit. A problem in this regard is that if the batteries are disconnected and the overvoltage protection circuit is tripped, then all power to the loads is lost and thus the vehicle is without power to vehicle electric functions.

One such critical function may be electric servos to the steering system of the vehicle, thus rendering the vehicle uncontrollable. One possible solution to avoid such critical situations is to have redundancy in the electrical power system, and in particular to have several maintenance batteries connected independently in the system, assuring maintained power if one of the batteries would fail. The drawback with such a system is added battery cost and added space requirements as well as added weight.

BRIEF DESCRIPTION OF INVENTION

The aim of the present application is to remedy the drawbacks of the state of the art regarding operation of converters in electrically propelled vehicles. This aim is obtained by a method according to the independent patent claim. Preferable solutions form the subject of the dependent patent claims.

According to one aspect a method of operating a converter within an operating range is provided, the converter being comprised in an electrical circuit for a vehicle, which electrical circuit comprises at least one load and at least one battery. The method may comprise the steps of determining the operating range by determining the relation between output current from the converter with rapid current drop in the electrical circuit, which rapid current drop is based on parameters from the at least one load and the at least one battery, and regulating the voltage from the converter for controlling the output current within the determined operating range.

With the term rapid current drop in the electrical circuit is herein meant a drop in current in the electrical circuit due to the current drop being caused by behavior of at least one load and/or at least one battery, whereby the drop in current occurs very fast or rapidly, i.e. during a short amount of time. The behavior may e.g. be the disconnection, malfunction or breakdown of one or more loads and/or batteries in the electrical circuit.

The relation between the output current from the converter and the rapid current drop in the electrical circuit may define a boundary or line delimiting at least a part of the operating range or zone of the converter. This will be explained in greater detail below.

Thus, stated a bit differently, a method of operating the converter within an operating range is provided, the converter being comprised in an electrical circuit for a vehicle, which electrical circuit comprises at least one load and at least one battery pack. The method comprises the steps of determining the operating range by determining the relation between output current from the converter and rapid current drop in the electrical circuit, wherein the rapid current drop is caused by disconnection, malfunction or breakdown of the at least one load and/or the at least one battery, and regulating the output voltage from the converter for controlling the output current from the converter within the determined operating range.

With this solution, the converter will be operated within an operating range within which the risk of an overvoltage protection switch of the converter will not be triggered by sudden voltage transients if loads or battery packs in the circuit are suddenly disconnected or their functions are suddenly disrupted. In this regard, parameters mentioned in the above paragraph is to be embracing normal functional parameters such as the behavior of the different loads during normal operation as well as non-normal parameters such as break down or malfunction of loads and battery pack and even disconnection, such as a battery connection being disconnected from a battery pole. With the term battery pack is herein meant any battery unit, device or arrangement, e.g. one or several so-called low voltage batteries (12 V), as will be explained in greater detail below. Thus, battery pack will interchangeably be referred to as "battery pack(s)", "battery", "batteries" or "maintenance batteries" in this disclosure.

According to a further aspect, the method may comprise the further step of measuring the current through the at least one battery for operating the converter. The data can then be used such that the voltage is lowered if the converter is operating outside the determined operating range. Thus, the data representing the measured current through the at least one battery is used when regulating the voltage of the converter in order to control the output current from the converter. By measuring the current through the at least one battery it can be determined how much current is used by the battery. Thereby the percentage of the total current in the circuit being used by the battery can be determined. By knowing this it can be determined how much current may be lost if the battery is disconnected or malfunctions. If the amount of current being used by the battery is large a large current drop is possible which may indicate that the converter voltage should be lowered, and vice versa. Thus, an advantage of this embodiment is that the converter voltage can be controlled such that the risk of the overvoltage switch being triggered is reduced even further.

According to one aspect, the determination of the operating range may be based mainly on a sudden disconnection or malfunction of said at least one battery pack. This is because it is usually more serious if the battery is disconnected than if one or more loads are disconnected or malfunction, due to the capability of the batteries to reduce the adverse effects of sudden high voltage transients if a sudden current drop occurs.

When operating a vehicle, the method may comprising the steps of, at the start of the vehicle, setting a low output voltage of the converter (also referred to herein as charging voltage over the circuit), measuring the output current from the converter and the current through the at least one battery, comparing the measured data with the determined operating range, and regulating the voltage over the circuit, wherein the voltage is increased if within the determined operating range, and the voltage is decreased if outside the determined operating range.

The low voltage at the start of the vehicle provides a low charging current well within the determined operating range, even if the battery might be in need of higher charging currents, for instance if the battery is discharged or weak. The voltage is then increased as long as the converter operates within the operating range, but as soon as the converter is operating outside the operating range, the voltage is lowered in order to come back within the permissible operating range. In this regard, the increase of voltage may be performed in steps of 1-5% and decrease of voltage may performed in steps of 2-10%.

According to the application, it may also comprise a computer program product comprising instructions which, when the program is executed by a computer, cause the computer to carry out the method of operating a converter, as a computer-readable storage medium comprising instructions which, when executed by a computer, cause the computer to carry out the method.

Further, according to the application, it may comprise a controller connected to a converter in an electric circuit comprising at least one load and at least one battery, the controller comprising data over a determined operating range, wherein the controller is configured to perform the method. The controller may further be comprised in an electrical circuit for a vehicle, comprising a converter, at least one load and at least one battery, sensors for measuring current through the at least one battery, sensors for measuring output current from the converter and sensors for measuring voltage over the circuit, wherein the controller is connected to the sensors and the converter. The circuit may in turn be provided in vehicle.

These and other aspects of, and advantages with, the present invention will become apparent from the following detailed description of the invention and from the accompanying drawings.

BRIEF DESCRIPTION OF DRAWINGS

In the following detailed description of the invention, reference will be made to the accompanying drawings, of which

DETAILED DESCRIPTION OF THE INVENTION

Figure 1:
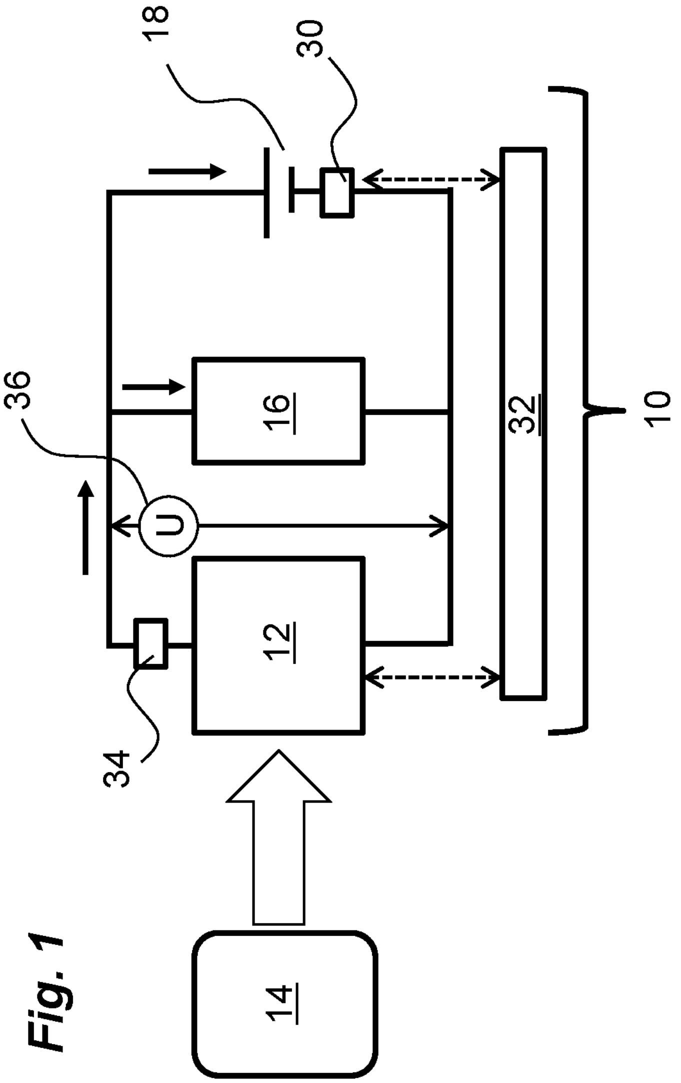
FIG. 1 is a schematic view of an electric circuit comprised in a vehicle, and in particular an electrically propelled vehicle.

FIG. 1 shows schematically an electric power system 10 comprised in an electrically propelled vehicle. The electric power system 10 in turn comprises a converter 12 electrically connected to a propulsion battery pack 14 of the vehicle, a number of loads 16 as well as maintenance batteries 18. The converter 12 is designed to convert high voltages from the propulsion battery system, for example from 500V and upwards, to low voltages for loads and maintenance batteries, for example 12-48V.

The converter is provided with an overvoltage protection circuit for preventing high voltage from the converter in case of serious internal failures. The loads 16 may be many different types of electrically operated equipment needed for the function of the vehicle, where some of these functions are critical, such as for instance power steering servos. Regarding the maintenance battery 18, also referred to as the maintenance battery pack 18, it can usually be one or two 12V batteries, in the latter case often connected in series to obtain 24V. The output current from the converter 12 is preferably measured by a sensor 34 and the charging current through the battery 18 is preferably measured by a sensor 30. Also, the voltage over the circuit may be measured by a sensor 36. Data from the sensors may be provided to a controller 32 for controlling the operation of the converter 12.

The energy from the converter 12 via the propulsion battery system 14 is thus provided for operating the different loads 16 as well as for charging the maintenance batteries 18. In order to ascertain that in particular the loads 16, and more particularly the critical loads, it is important that these loads 16 are provided with power at all times. Usually the energy needed is provided from the converter.

However, if there is a disturbance in the power system, and in particular if the maintenance battery pack 18 is suddenly disconnected, the current drop can be significant which in turn can cause a very high voltage transient. This in turn may cause the overvoltage protection of the converter 12 to trip and thus the energy from the converter 12 to be cut off. If then both the battery 18 and the converter 12 are lost, the loads 16 are no longer provided with power, with may lead to dangerous driving situations if for example the vehicle is provided with electrical steering servos. The vehicle is then not possible to steer anymore. In this regard, there might be other components and functions that are critical or at least very important for the function of the vehicle where a power loss may be serious.

In this context, the present application has the aim of ensuring that the function of the converter 12 is maintained as much as possible. It is then important that the converter 12 operates in current ranges in which the overvoltage protection is not likely to trip if a sudden current drop should occur.

Figure 2:
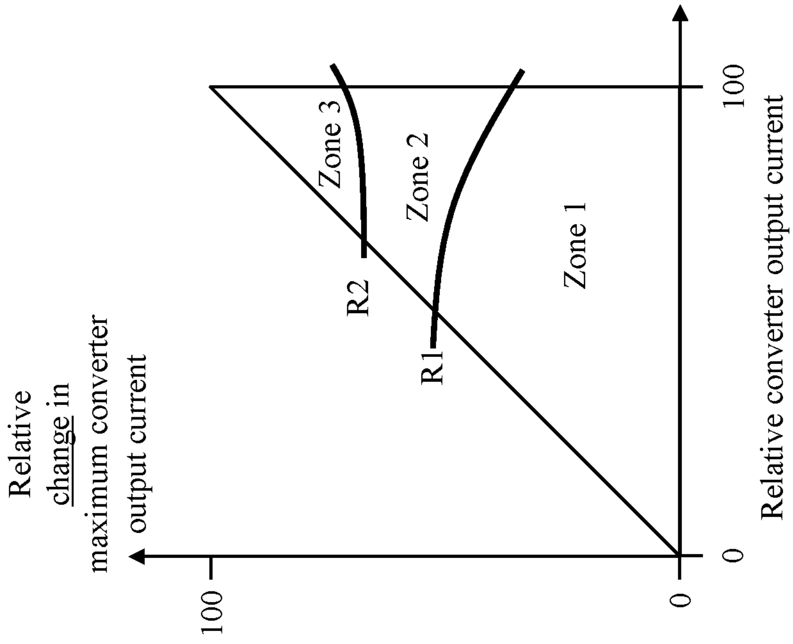
FIG. 2 is a diagram showing the relation between relative converter output current and relative change in converter output current.

FIG. 2 shows a diagram illustrating different operating ranges. The X-axis shows the output current from the converter to the electric power system as a percentage of the maximum converter output current, and the Y-axis shows the magnitude of the current drop, or percentage change in maximum converter output current, where 100% represents a drop from, for example 180 A to 0 A and 50% represents a drop from for example 180 A to 90 A. from the above, it is likely that small drops eliminate the risk of tripping of the overvoltage protection of the converter. It is to be understood that 180 A is to be regarded as only an example, the actual converter 12 used may have a lower or a higher maximum current output.

Figure 3:
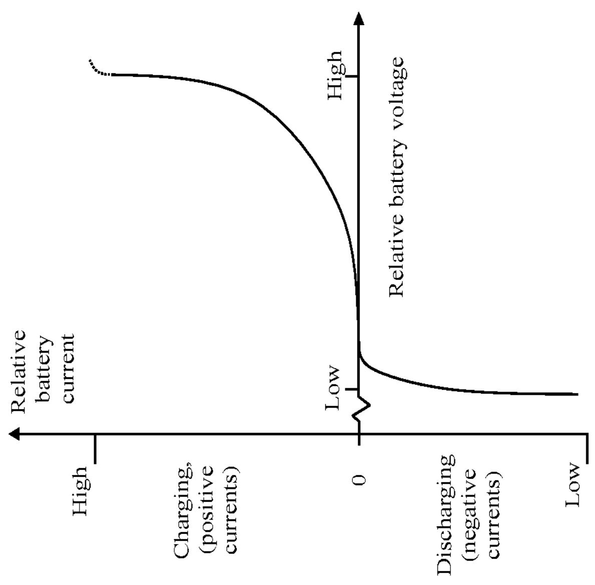
FIG. 3 is a diagram showing an example of relations between relative battery voltage and relative charging current, FIG. 4 schematically shows a setup for determining an operating range for a converter.

FIG. 3 shows an example of relation between battery voltage and battery current. As seen from the diagram, the charging current increases when the charging voltage increases. Another battery characteristic is that the voltage drops if the batteries are discharged. The more current discharged from the batteries the lower the battery voltage becomes. The exact relation between battery voltage and battery current varies a lot between different conditions. Battery temperature, battery charge level and dynamics (changes in current) are only three affecting factors that makes it hard to give a quantitative relation.

Figure 4:
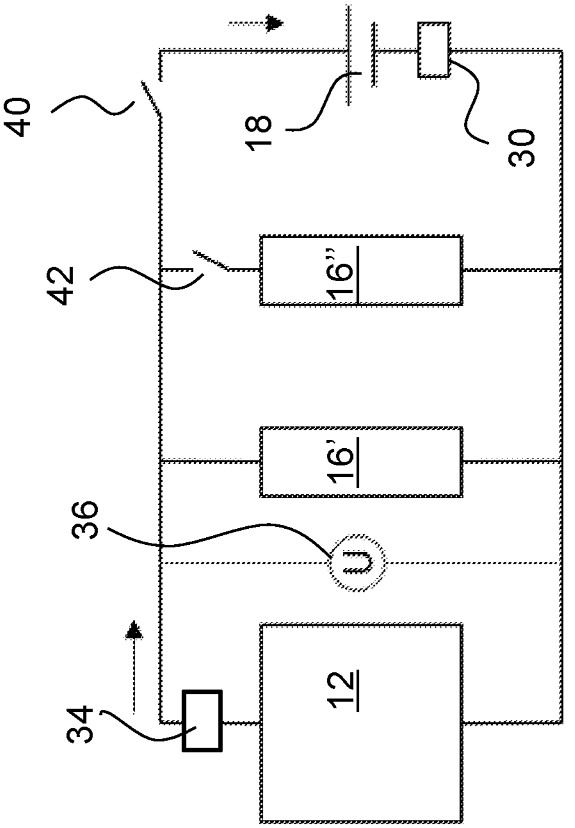

It is according to the application important to determine and map operating areas, zones or ranges in the diagram where the converter 12 can operate safely without the risk of tripping and thereby disconnecting. One possible example of performing such a determination is shown in FIG. 4. The setup is in this case a controlled lab-test system. The converter 12 is connected to at least two adjustable loads 16', 16" with known properties and at least one maintenance battery pack 18. The output current from the converter is measured by a sensor 34 and the current through the at least one battery pack is measured by a sensor 30. The voltage over the converter 12 is measured as well by a sensor 36.

When performing the tests, the system is started with moderate voltage and loads. The battery 18 is then disconnected by a switch 40. The loads 16', 16" are then adjusted to the desired output current and also that disconnection of load 16" in FIG. 4 provides the desired sudden current drop. That is to say that the loads 16', 16" are also adjusted such that when load 16" is disconnected, a desired rapid or sudden current drop is achieved in the circuit. Load 16" is then disconnected by a switch 42 in order to create the desired sudden current drop, and it is noted if the overvoltage switch in the converter 12 is tripped or not. This is then performed for different output currents and different magnitudes of sudden current drop in order to determine an operating range or zone, zone 1 in FIG. 2, within which the converter 12 continues to function without the overvoltage switch tripping. A border line R1 is also determined wherein the zone above the border R1, zone 2 in FIG. 2, is an operating area where the overvoltage switch might trip, and which area is to be avoided during operation of a vehicle with this type of converter 12. Thus, this border line R1 is determined empirically by the method described above, and describes a relation or relationship between the output current from the converter and the rapid current drop in the electrical circuit. Stated in a different way, the relation or relationship between the output current from the converter and the rapid current drop in the electrical circuit defines the border line R1. And therefore also the operating range, zone 1. With the test, it is also possible to find a second border line R2 and a zone 3 above this second border line R2, in which zone 3 it is very likely that the overvoltage switch will trip. Zone 3 may even delimit a zone where the overvoltage switch will always trip when the converter 12 experiences a rapid current drop. It may be allowed to operate in zone 2 and even in zone 3 if the vehicle is in an operational state where no hazards arise in case of power loss, for instance at stand still of the vehicle.

As has been described above, a relation between the output current from the converter and the rapid current drop in the electrical circuit may define a boundary or line delimiting at least a part of the operating range or zone of the converter. Additionally, several lines may be defined such that more zones or operating ranges are delimited. These lines are indicated in FIG. 2 as R1 and R2. The operating range, or zone, is indicated as Zone 1 in FIG. 2 and falls below R1. In FIG. 2 the operating range or zone (zone 1) is encompassed in the two-dimensional space spanned by the possible output current of the converter and the possible change, e.g. drop, in converter output current. The full operating range or zone, as can be seen in FIG. 2 is delimited by three lines. The first line is the line defined by the relation or relationship between the output current from the converter and a rapid current drop in the electrical circuit. The second line is the vertical line at 100% output current for the converter 12. Finally, the third line is the 45 degree line defining the maximum current drop possible at a certain converter output current (the current drop can for obvious reasons never be more than the output current). The second and third line do not need to be mapped out empirically, since they follow mathematically. The aim is to keep the converter 12 operating in this zone 1, except in circumstances where a higher risk for tripping the overvoltage switch can be accepted, e.g. at a standstill. By mapping out the operating range in this manner a robust and reliable way of determining whether the converter 12 is operating in an operating zone or operating range with an increased risk of tripping the overvoltage switch can be achieved. It is to be understood that the relationships illustrated in FIG. 2 holds especially for rapid current drops, i.e. current drops caused by e.g. disconnection, malfunction or breakdown of one or more loads and/or batteries in the electrical circuit. If the current were to drop very slowly the risk for tripping of the overvoltage switch is lower. Of course, the operating zone or range Zone 1 would still define a zone where the risk for tripping of the overvoltage switch is eliminated.

Another way of determining an operating range is to perform tests on a production vehicle provided with a converter, a maintenance battery pack and a plurality of actual loads that the vehicle is provided with. Different loads are then activated for obtaining certain output currents from the converter, wherein the output current is measured continuously, and physical disconnection of the maintenance battery pack is performed in order to provide sudden current drops in the circuit. As with the above mentioned test, an operating range is obtained and determined for different output currents and different magnitudes of sudden current drop, in which operating range the converter will continue to operate without the overvoltage switch tripping.

Figure 5:
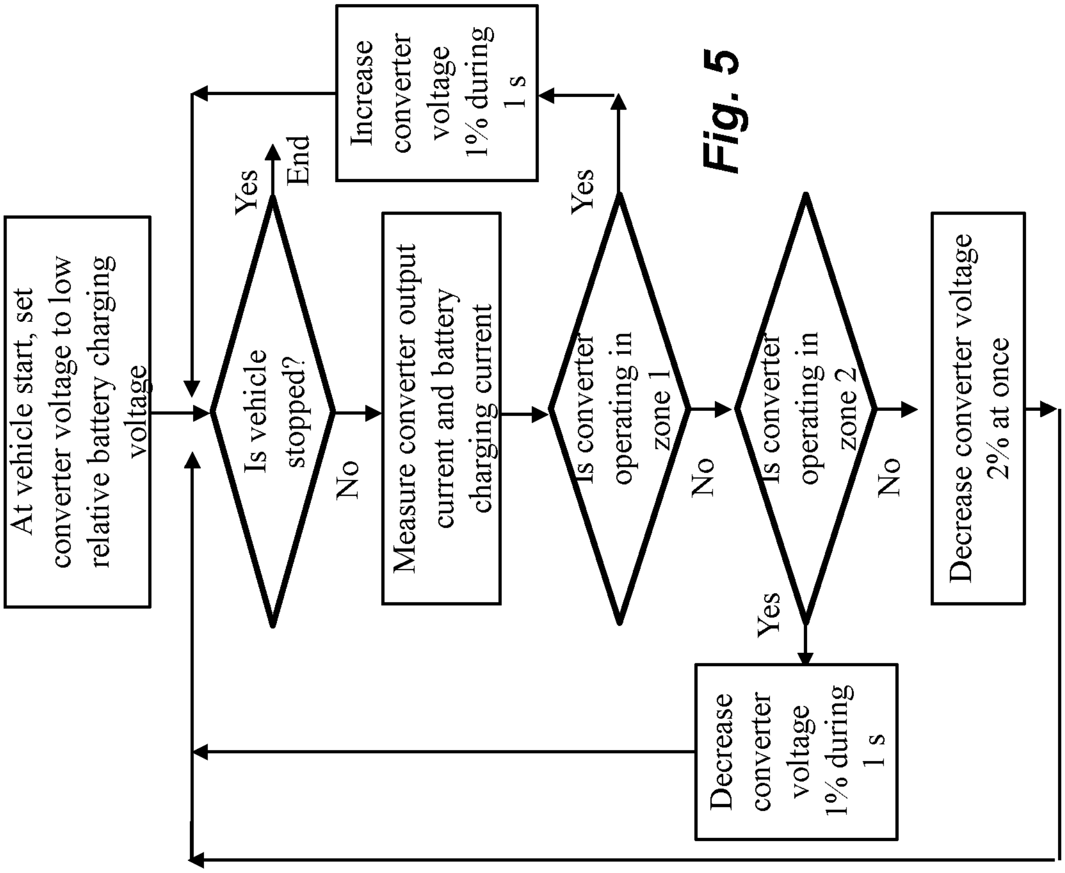
FIG. 5 shows a flow chart of an example of operating a converter during operation of a vehicle.
Figure 6:
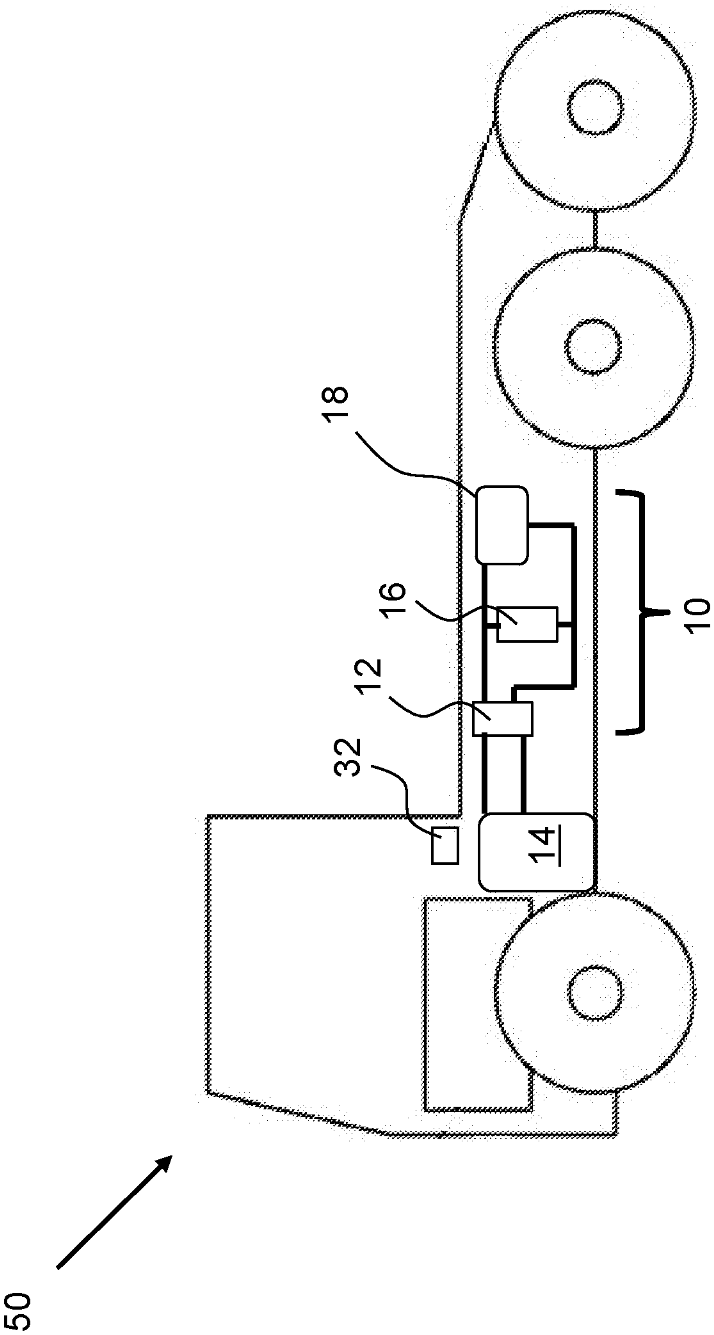
FIG. 6 shows a schematic view of a vehicle provided with an electric circuit according to the application.

FIG. 5 shows a flow chart with one example of operating a vehicle 50, FIG. 6, having a converter 12 with an operating range that has been determined as described. At start of the vehicle, the converter is controlled to output a low relative charging voltage, and as seen from FIG. 3, which shows an example of the relation between relative charging voltage and relative charging current for a battery, a low current is fed to the battery. This is done even if for instance the maintenance battery pack 18 is rather discharged and could be fed with a larger charging current. The battery charging current is continuously measured by a battery sensor 30, FIG. 1, and is processed by a suitable controller 32, also called control arrangement 32, which controller 32 is connected to and controls and regulates the converter 12. In this regard, the output current from the converter 12 is also measured continuously by a sensor 34 as well as the voltage over the circuit, also referred to as the voltage over the converter 12 herein. The measured data is transmitted to the controller 32. The controller 32 is further provided with stored data regarding the permissible operating range, zone 1, that previously has been determined. If the measured current data indicates that the converter is operating in zone 1, the controller will adjust the voltage over the circuit, thereby increasing the charging current through the maintenance battery pack 18. As a mere example, the voltage increase could be 1% during 1 second. If the measured data indicates that the converter is still in the zone 1, the increase in voltage could continue. However, if the measured data indicates that the converter is operating on or above the permissible zone, i.e. is operating in zone 2, then the voltage over the converter 12 is decreased, which decrease for example could be 1% during 1 second. Further, should the converter be above zone 2, operating in zone 3, then the voltage is immediately lowered by the controller in order to set the converter in the permissible operating range.

By this active control of the converter to operate in the permissible, safe, operating range, the risk of the converter being disconnected from the circuit is greatly reduced. Even if the controller 32 has been depicted as a separate unit in FIG. 1, it might be integrated in electronic units that handle several functions of the vehicle. Alternatively, the controller may be an integrated part of the converter.

The control arrangement 32 comprises control circuitry to perform the method according to any one of the steps, examples or embodiments as described herein. The control arrangement 32 may include one or more Electronic Control Units (ECUs) connected to a controller area network (CAN). For example, the control arrangement 32 may be an Electrical Control Unit, ECU, of the ACC. More in detail, the control arrangement 32 comprises one, or more, computer(s) and memory. The computer comprises any hardware or hardware/firmware device implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit, or any other device capable of electronically performing operations in a defined manner.

In some embodiments, the computer-readable medium may be a non-transitory computer-readable medium, such as a tangible electronic, magnetic, optical, infrared, electromagnetic, and/or semiconductor system, apparatus, and/or device. The computer-readable memory is for example one or more of the memories in the control arrangement 32. Hence, the proposed method may be implemented as a computer program. The computer program then comprises instructions which, when the computer program is executed by a computer, cause the computer to carry out the method according to any one of the aspects, embodiments or examples as described herein.

In further embodiments, the control arrangement 32 is configured to perform the method according to any one of the embodiments described above.

Even though the above embodiment has described a mainly electrically powered vehicle, it is to be understood that the solution according to the application also can be used for hybrid vehicles provided with both an electric machine for propulsion as well as another type of propulsion engine powered by for example diesel, petrol, gas, just to mention a few. Further, the solution has been described in connection with a converter. In this context, converter is to be seen as a general power source that may comprise other types of components capable of converting voltage levels, as well as generators capable of providing voltage and current to an electrical circuit comprising batteries.

It is to be understood that the embodiments described above and shown in the drawings is to be regarded only as non-limiting examples and that the solution may be modified in many ways within the scope of the patent claims.

The invention claimed is:

1. A method of operating a converter within an operating range, the converter being comprised in an electrical circuit for a vehicle, which electrical circuit comprises at least one load and at least one battery pack, said method comprising:
- determining the operating range of the converter based on a relationship between an output current from the converter and a detection of a rapid current drop in the electrical circuit, wherein the rapid current drop is caused by one or more parameters associated with the at least one load and/or the at least one battery pack; and
- regulating a voltage output from the converter to thereby control the output current of the converter to be within the determined operating range.

2. A method according to claim 1, further comprising measuring a current through the at least one battery pack for operating the converter.

3. A method according to claim 1, wherein the voltage from the converter is lowered if the converter is operating outside the determined operating range.

4. A method according to claim 1, wherein the one or more parameters is a sudden disconnection or malfunction of said at least one load and/or at least one battery pack.

5. A method according to claim 1, further comprising:
- at a start of the vehicle, controlling the converter to output a low charging voltage over the circuit;
- measuring the output current from the converter and a current through the at least one battery pack;
- comparing the measured output current from the converter and the current through the at least one battery pack with the determined operating range; and
- regulating a voltage over the circuit, wherein:
  - the voltage over the circuit is increased if the voltage is within the determined operating range, and the voltage over the circuit is decreased if the voltage is outside the determined operating range.

6. A method according to claim 5, wherein the increase of voltage over the circuit is performed in steps of either: 1%-5% or 2%-10%.

7. A computer program product stored on a non-transitory computer-readable medium, said computer program product for operating a converter within an operating range, the converter being comprised in an electrical circuit for a vehicle, which electrical circuit comprises at least one load and at least one battery pack, wherein said computer program product comprising computer instructions to cause one or more computing devices to perform the following operations:

determine the operating range of the converter based on a relationship between an output current from the converter and a detection of a rapid current drop in the electrical circuit, wherein the rapid current drop is caused by one or more parameters associated with the at least one load and/or the at least one battery pack; and regulating a voltage output from the converter to thereby control the output current of the converter to be within the determined operating range.

8. A controller connected to and configured for controlling within an operating range a converter in an electric circuit, said electric circuit comprising at least one load and at least one battery pack, the controller configured to:

determine the operating range of the converter based on a relationship between an output current from the converter and a detection of a rapid current drop in the electrical circuit, wherein the rapid current drop is based on caused by one or more parameters associated with the at least one load and/or the at least one battery pack; and regulate a voltage output from the converter to thereby control the output current of the converter to be within the determined operating range.

9. An electrical system configured for use in a vehicle, said electrical system comprising:

a converter;

at least one load;

at least one battery pack;

sensors for measuring current through the at least one battery pack;

sensors for measuring output current from the converter;

sensors for measuring voltage over the electrical circuit; and a controller connected to the sensors and the converter, and configured for controlling the converter within an operating range, said controller configured to:

determine the operating range of the converter based on a relationship between an output current from the converter and a detection of a rapid current drop in the electrical circuit, wherein the rapid current drop is caused by one or more parameters associated with the at least one load and/or the at least one battery pack; and regulate a voltage output from the converter to thereby control the output current of the converter to be within the determined operating range.

10. A vehicle comprising an electrical system, said electrical system comprising:

a converter;

at least one load;

at least one battery pack;

sensors for measuring current through the at least one battery pack;

sensors for measuring output current from the converter;

sensors for measuring voltage over the electrical circuit; and a controller connected to the sensors and the converter, and configured for controlling the converter within an operating range, said controller configured to:

determine the operating range of the converter based on a relationship between an output current from the converter and a detection of a rapid current drop in the electrical circuit, wherein the rapid current drop is caused by one or more parameters associated with the at least one load and/or the at least one battery pack; and regulate a voltage output from the converter to thereby control the output current of the converter to be within the determined operating range.

11. A computer program product according to claim 7, further comprising computer instructions to cause one or more computing devices to perform the following operation of measuring a current through the at least one battery pack for operating the converter.

12. A computer program product according to claim 7, wherein the voltage from the converter is lowered if the converter is operating outside the determined operating range.

13. A computer program product according to claim 7, wherein the one or more parameters is a sudden disconnection or malfunction of said at least one load and/or at least one battery pack.

14. A computer program product according to claim 7, further comprising computer instructions to cause one or more computing devices to perform the following operation:

at a start of the vehicle, controlling the converter to output a low charging voltage over the circuit;

measuring the output current from the converter and a current through the at least one battery pack;

comparing the measured output current from the converter and the current through the at least one battery pack with the determined operating range; and regulating a voltage over the circuit, wherein:

the voltage over the circuit is increased if the voltage is within the determined operating range, and the voltage over the circuit is decreased if the voltage is outside the determined operating range.

15. A controller according to claim 8 further configured to measure a current through the at least one battery pack for operating the converter.

16. A controller according to claim 8, wherein the voltage from the converter is lowered if the converter is operating outside the determined operating range.

17. A controller according to claim 8, wherein the one or more parameters is a sudden disconnection or malfunction of said at least one load and/or at least one battery pack.

18. A controller according to claim 8 further configured to:

at a start of the vehicle, control the converter to output a low charging voltage over the circuit;

measure the output current from the converter and a current through the at least one battery pack;

compare the measured output current from the converter and the current through the at least one battery pack with the determined operating range; and regulating a voltage over the circuit, wherein:

the voltage over the circuit is increased if the voltage is within the determined operating range, and the voltage over the circuit is decreased if the voltage is outside the determined operating range.

19. A method according to claim 1, wherein the relation between the output current from the converter and the rapid current drop in the electrical circuit defines a boundary of the operating range of the converter.

20. A method according to claim 1, wherein a voltage from the converter above the determined operating range is a voltage where an overvoltage switch may trip.

* * * * *